(12) United States Patent
Kang et al.

(10) Patent No.: US 11,606,007 B2
(45) Date of Patent: Mar. 14, 2023

(54) MOTOR AND ELECTRIC VEHICLE INCLUDING THE SAME

(71) Applicant: LG Magna e-Powertrain Co., Ltd., Incheon (KR)

(72) Inventors: Joohang Kang, Seoul (KR); Yoonuk Kim, Seoul (KR); Junggu Lee, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 406 days.

(21) Appl. No.: 16/846,212

(22) Filed: Apr. 10, 2020

(65) Prior Publication Data

US 2021/0203211 A1 Jul. 1, 2021

(30) Foreign Application Priority Data

Dec. 31, 2019 (KR) .......................... 10-2019-0178791

(51) Int. Cl.
  *H02K 21/14* (2006.01)
  *H02K 11/01* (2016.01)
  *B60K 1/04* (2019.01)
  *H02K 5/24* (2006.01)

(52) U.S. Cl.
  CPC .............. *H02K 11/014* (2020.08); *B60K 1/04* (2013.01); *H02K 5/24* (2013.01); *H02K 21/14* (2013.01)

(58) Field of Classification Search
  CPC ........ H02K 1/27; H02K 7/1823; H02K 1/223; H02K 21/028; H02K 11/25; H02K 21/14; H02K 1/16; H02K 11/014; H02K 5/24; H02K 3/487; F01D 15/10; B60K 1/04
  See application file for complete search history.

(56) References Cited

U.S. PATENT DOCUMENTS

| | | | | |
|---|---|---|---|---|
| 4,190,794 | A * | 2/1980 | Mikulic | H02P 25/24 310/191 |
| 7,902,700 | B1 * | 3/2011 | Gabrys | H02K 11/014 310/156.83 |
| 10,680,474 | B2 * | 6/2020 | Gajanayake | H02K 1/27 |
| 2004/0251765 | A1 | 12/2004 | Dooley et al. | |
| 2008/0238220 | A1 | 10/2008 | El-Rafaie et al. | |
| 2015/0130390 | A1 | 5/2015 | Pietromonaco | |
| 2018/0342916 | A1 | 11/2018 | Krizan et al. | |
| 2019/0207446 | A1 * | 7/2019 | Swales | H02K 21/028 |
| 2019/0341820 | A1 | 11/2019 | Krizan et al. | |

FOREIGN PATENT DOCUMENTS

| | | |
|---|---|---|
| EP | 1 035 635 A2 | 9/2000 |
| EP | 1 220 427 A2 | 7/2002 |
| EP | 3 484 031 A1 | 5/2019 |

OTHER PUBLICATIONS

Extended European Search Report, dated Nov. 10, 2020, issued in European Patent Application No. 20178200.0-1201 (11 pages).

* cited by examiner

*Primary Examiner* — Ahmed Elnakib
*Assistant Examiner* — Leda T Pham
(74) *Attorney, Agent, or Firm* — Birch, Stewart, Kolasch & Birch, LLP (57) ABSTRACT

A motor may include a shield member that screens a magnetic field between a stator and a rotor, and a moving member that controls a position of the shield member in response to an electromagnetic interaction with the stator such that the screening of the magnetic field is configured to be selectively performed. The motor may prevent a generation of a counter electromotive force or regenerative braking.

18 Claims, 8 Drawing Sheets

MOTOR AND ELECTRIC VEHICLE INCLUDING THE SAME

CROSS-REFERENCE TO RELATED APPLICATION

This application claims the benefit of Korean Patent Application No. 10-2019-0178791, filed on Dec. 31, 2019, in the Korean Intellectual Property Office, the disclosure of which is incorporated herein in its entirety by reference.

BACKGROUND

1. Field

This disclosure relates to a motor and an electric vehicle including the motor.

2. Description of the Related Art

A motor is a power device that generates a rotational force using electric power and is widely used in various fields such as a fan, a washing machine drum, and a drone blade.

The motor may include a stator and a rotor that rotates relative to the stator. The stator may include a winding coil. When a current is applied to the winding coil, a magnetic field may be formed around the stator. Due to the magnetic field, the rotor may rotate relative to the stator, thereby generating power.

Meanwhile, for various types of electric vehicles (e.g., an electric kickboard, an electric bicycle, an electric scooter, a hybrid electric vehicle (HEV), a battery electric vehicle (BEV), etc.) using the motor as a power source, when the motor is driven by inertia as in a case in which the electric vehicle runs elastically by inertia or travels downhill, a regenerative braking charging function that recovers energy through a regenerative torque and charges the battery is taken in consideration.

However, since the regenerative torque and a traveling distance are in a mutually opposite relationship, the traveling distance corresponding to the inertia driving may be reduced in response to the regenerative torque being generated. For example, even when the inertia driving is intended at a constant speed, the regenerative braking may occur so that a driving speed decreases irrespective of the user's driving intention. As a result, unnecessary energy recycling due to the frequent generation of the driving torque and the regenerative torque may reduce fuel efficiency and maximum movable distance of the electric vehicle.

Also, when the regenerative braking occurs, a drag phenomenon in which a body of a driver is dragged in a direction opposite to a driving direction may occur, which may cause an uncomfortableness (e.g., jerk) of the driver and degrades a drivability during the driving.

In addition to the aforementioned cases, when a rotor of the motor rotates by inertia in an electronic device (e.g., a washing machine) including the motor, an unintended counter electromotive force may be generated, which may reduce an energy efficiency.

SUMMARY

To solve the aforementioned issues, a damper or clutch may be installed in an electric vehicle. However, in this case, the installation of the damper or clutch may result in space waste and an increase in manufacturing costs.

Also, control technologies that restrict a driving torque change rate or generate a damping force in a reversed direction of vibration generated when regenerative braking occurs may require a considerably precise design and, under a certain condition, deteriorate a torque responsiveness.

An aspect of the present disclosure provides a motor to solve a problem caused by the regenerative braking or a counter electromotive force generated due to inertia driving in a mechanical manner, and an apparatus including the motor.

According to an aspect, there is provided a motor including a shield member that screens a magnetic field between a stator and a rotor, and a moving member that controls a position of the shield member based on an electromagnetic interaction with the stator such that screening of the magnetic field is selectively performed.

The motor includes a stator, a rotor configured to rotate inside the stator based on an electromagnetic interaction with the stator, a shield member including a plurality of shield elements to screen a magnetic field between the stator and the rotor, and a moving member configured to control a position of the shield member based on an electromagnetic interaction with the stator such that screening of the magnetic field is selectively performed.

The stator may include a plurality of receiving grooves into which the plurality of shield elements is to be inserted. The moving member may be configured to position the shield elements inside the receiving grooves or outside the receiving grooves based on the electromagnetic interaction with the stator.

The shield member may be configured to screen a magnetic field flow between the stator and the rotor when the shield elements are located inside the receiving grooves, and not to screen the magnetic field flow between the stator and the rotor when the shield elements are located outside the receiving grooves.

The plurality of shield elements is arranged between the stator and the rotor to be spaced at equal intervals in a circumferential direction.

The moving member may include a support element disposed at end portions of the shield elements to integrally rotate with the shield member, a magnetic element disposed on one side of the support element and rotate the support element in a first direction based on an electromagnetic interaction with the stator, and an elastic element disposed on the other side of the support element and compressed based on the rotating by the magnetic element.

The elastic element may be interposed between a first protrusion formed in the stator and a second protrusion formed in the support element, and compressed by the first protrusion of the stator and the second protrusion of the support element when the support element rotates in the first direction.

When the electromagnetic interaction between the stator and the magnetic element does not occur, the support element may rotate in a second direction opposite to the first direction based on a compression restoring force by the elastic element.

The shield member may be configured to screen the magnetic field between the stator and the rotor in response to the shield elements being located inside the receiving grooves when the support element rotates in the second direction based on the compression restoring force by the magnetic element.

The shield member may be configured not to screen a magnetic field flow between the stator and the rotor in response to the shield elements being located outside the receiving grooves when the support element rotates in the first direction based on the electromagnetic interaction between the stator and the magnetic element.

The support element may be disposed at each of a front end portion and a rear end portion of the shield member.

The moving member may include a plurality of elastic members spaced apart from one another.

According to another aspect, there is also provided an electric vehicle including a battery and a motor configured to generate a rotational torque by receiving electric power from the battery, wherein the motor includes a stator, a rotor configured to rotate based on an electromagnetic interaction with the stator, a shield member configured to screen a magnetic field formed based on the electromagnetic interaction between the stator and the rotor, and a moving member configured to control a position of the shield member based on an electromagnetic interaction with the stator.

The moving member may include a support element configured to integrally rotate with the shield member, a magnetic element configured to generate an electromagnetic interaction with the stator, and an elastic element configured to guide a position of the support element.

In a case in which the rotor rotates based on the electromagnetic interaction between the stator and the rotor, the magnetic element may be configured to generate an electromagnetic interaction with the stator.

When the electromagnetic interaction between the stator and the magnetic element occurs, the shield member may be located outside receiving grooves formed in the stator so as not to screen a magnetic field flow between the stator and the rotor. Also, when the electromagnetic interaction between the stator and the magnetic element is eliminated, the shield member may be located inside the receiving grooves formed in the stator so as to screen the magnetic field flow between the stator and the rotor.

When the shield member is located inside the receiving grooves, charging of the battery based on a rotation of the rotor may be restricted.

The shield member may include a plurality of shield elements arranged between the stator and the rotor to be spaced at equal intervals in a circumferential direction. The support element may be provided in plural at both end portions of the plurality of shield elements to integrally rotate with the shield elements.

The support element may be rotated by the magnetic element or the elastic element in a clockwise direction or in counterclockwise direction by a predetermined distance.

The support element may be rotated by the magnetic element or the elastic element in the clockwise direction or in the counterclockwise direction to correspond to an interval at which the plurality of shield elements is arranged.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms "first," "second," etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Figure 1:
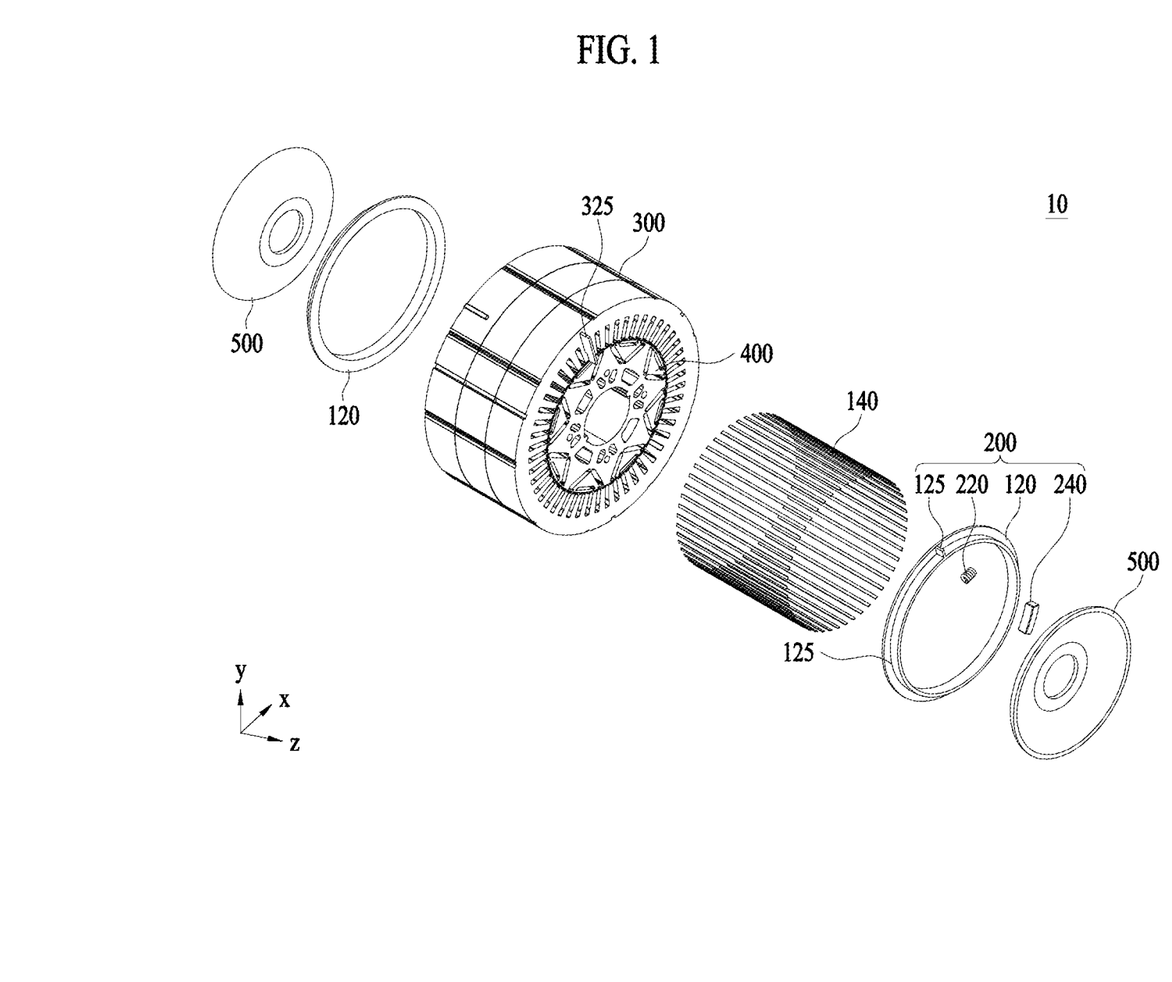
FIG. 1 is an exploded perspective view illustrating a motor according to at least one example embodiment of the present disclosure.
Figure 2:
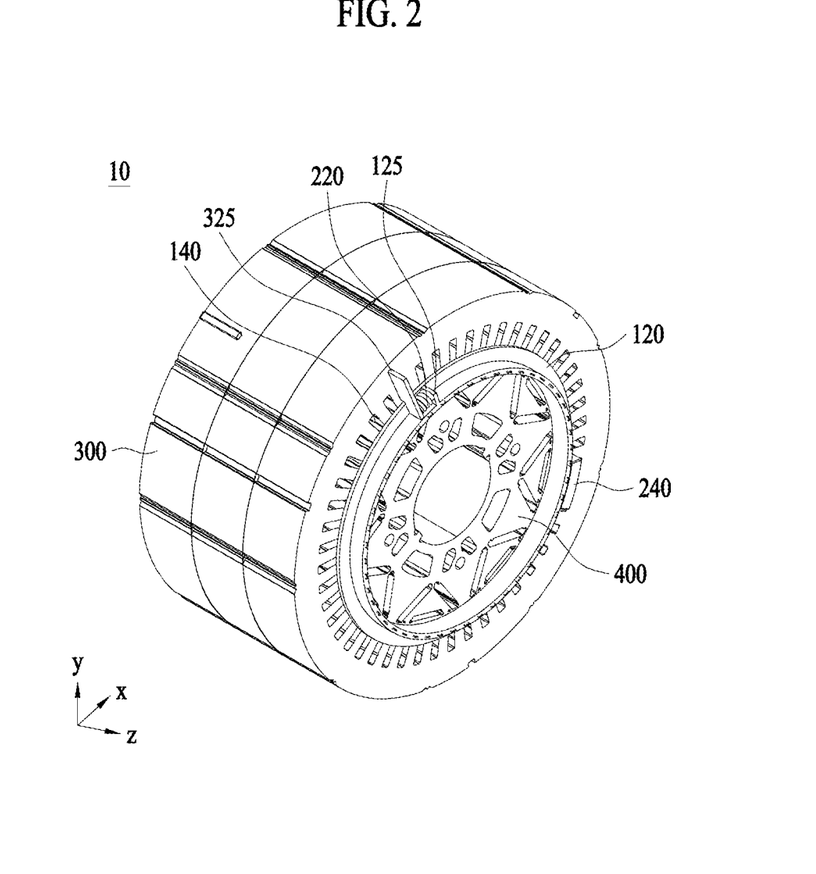
FIG. 2 is a perspective view illustrating a structure of a motor according to at least one example embodiment of the present disclosure.

FIG. 1 is an exploded perspective view illustrating a motor according to at least one example embodiment of the present disclosure. FIG. 2 is a perspective view illustrating a structure of a motor according to at least one example embodiment of the present disclosure.

According to at least one example embodiment, a motor 10 may generate a rotational torque by receiving electric power from a battery, thereby converting electric energy into power energy. The motor 10 may be mounted on an electric vehicle (e.g., an electric kickboard, an electric bicycle, an electric scooter, a hybrid electric vehicle (HEV), a battery electric vehicle (BEV), etc.) and rotate wheels of the electric vehicle while the motor 10 is driven.

Referring to FIGS. 1 and 2, the motor 10 includes a stator 300 and a rotor 400.

The rotor 400 (e.g., a rotator) may be disposed to be rotatable relative to the stator 300 (e.g., a stationary core) based on an electromagnetic interaction with the stator 300.

The stator 300 may include a winding coil. When a current is applied to the winding coil, a magnetic field may be formed around the stator 300. The rotor 400 may be driven in one direction, for example, a clockwise direction or a counterclockwise direction by the magnetic field around the stator 300.

For example, the rotor 400 may be disposed inside the stator 300 to rotate relative to the stator 300. However, embodiments are not limited to such structure of the motor 10, and various structures such as a structure in which the stator 300 is disposed inside the rotor 400 or a structure in which the rotor 400 faces the stator 300 are applicable here.

According to at least one example embodiment, the motor 10 may further include a shield member 140.

The shield member 140 may screen a magnetic field between the stator 300 and the rotor 400. The shield member 140 may include a magnetic shielding material that reduces an influence of external magnetic fields. For example, the shield member 140 may be formed of a high permeability alloy such as a magnetic material, permalloy, silicon steel, and the like.

As illustrated in FIG. 1, the shield member 140 may include a plurality of shield elements extending in an axial direction (e.g., +z direction) of the motor 10.

The plurality of shield elements included in the shield member 140 may be arranged between the stator 300 and the rotor 400 to be spaced apart from one another. For example, the shield elements may have a shape of a bar extending in the axial direction of the motor. Also, the shield elements are arranged to be spaced at equal intervals in a circumferential direction of the motor 10 so as to form a shape of a cage.

The shield elements may be axially or longitudinally greater in length than the stator 300 and the rotor 400. Both ends of the shield elements may be connected to a support element 120 of a moving member 200 and supported by the support element 120 outside of the stator 300 and the rotor 400.

For example, a number of the shield elements may be set to be equal to a number of slots 310 (refer to FIG. 4A) formed in the stator 300 such that the shield elements respectively correspond to the slots 310. Each of the shield elements may be disposed on an inner side of an end portion of each of the slots 310 in which a coil of the stator 300 is wound. That is, the shield elements are arranged between the winding coil of the stator 300 and the rotor 400 to restrict an electromagnetic interaction between the coil of the stator 300 and the rotor 400. A circumferential width of the shield element may be less than a width of the end portion of the slot 310 formed in the stator 300. For example, the shield member 140 may be disposed to be inserted into or released from a receiving groove 315 (refer to FIG. 4A) prepared in the end portion of the slot 310.

According to at least one example embodiment, the motor 10 may further include the moving member 200 to control a position of the shield member 140. Hereinafter, an operation of the moving member 200 will be described with reference to FIG. 3.

Figure 3:
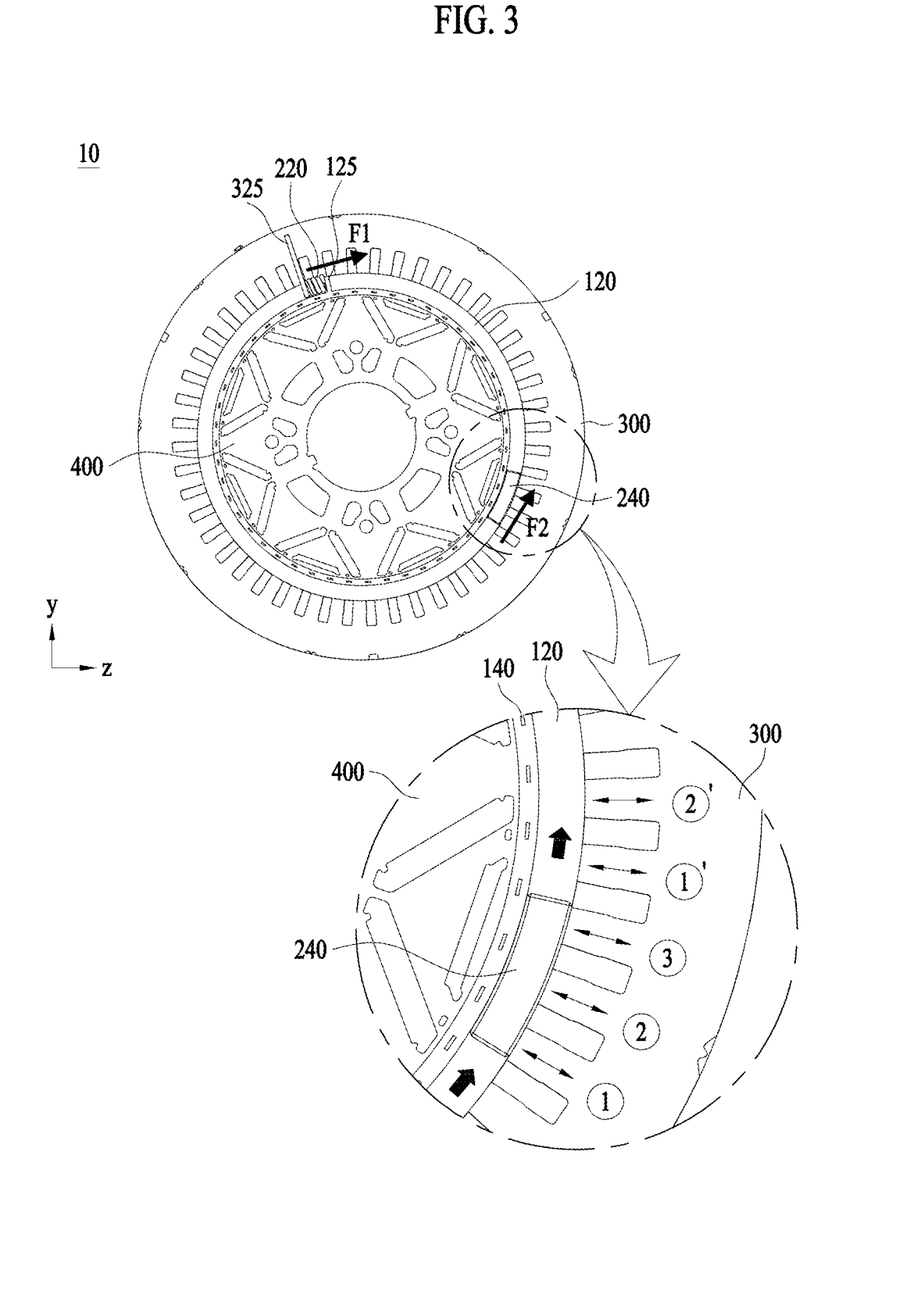
FIG. 3 is a cross-sectional view illustrating an operation of a motor according to at least one example embodiment of the present disclosure.

FIG. 3 is a cross-sectional view illustrating an operation of a motor according to at least one example embodiment of the present disclosure.

According to at least one example embodiment, the moving member 200 includes the support element 120, a magnetic element 240, and an elastic element 220.

The support element 120 may be connected to the shield member 140 to change a position of the shield member 140 using power of the moving member 200. For example, the support element 120 may have a ring shape to be connected to the shield elements of the shield member 140. Also, the support element 120 may be provided at a position between the stator 300 and the rotor 400 in both end portions in an axial direction of the stator 300 and the rotor 400. For example, an outer diameter of the support element 120 may be greater than an outer diameter of the rotor 400 and less than an outer diameter of the stator 300.

Both end portions (e.g., a front end portion and a rear end portion) of each of the shield elements of the shield member 140 may be fixed to the support element 120. Also, the shield elements of the shield member 140 may be arranged to be spaced at preset intervals in the circumferential direction of the support element 120.

The support element 120 may be disposed at each of a front end portion and a rear end portion of the shield member 140 (the plurality of shield elements). The support element 120 may support the shield member 140 at both end portions such that a position and an arrangement of the shield member 140 are maintained. Also, the support element 120 may be disposed to be rotatable based on a rotation axis of the motor 10 (for example, the rotor 400) so as to integrally rotate with the shield member 140.

The magnetic element 240 and the elastic element 220 may be located on one side of the support element 120. For example, the magnetic element 240 may be fixed to one side of an outer surface of the support element 120 having the ring shape to provide a rotational force to the support element 120.

The magnetic element 240 may move the support element 120 and the shield member 140 based on an electromagnetic interaction with the stator 300. For example, the magnetic element 240 may generate a rotational force F2 in one direction (e.g., a clockwise direction or a counterclockwise direction) based on a magnetic field formed in response to a current being applied to the coil wound in the stator 300.

A shape and size of the magnetic element 240 and the number of the magnetic element 240 are not limited as illustrated in FIGS. 1 and 2. Various shapes, sizes, and numbers of the magnetic elements 240 by which the magnetic element 240 is able to generate the electromagnetic interaction with the stator 300 (e.g., the winding coil of the stator 300) to rotate the support element 120 and the shield member 140 may apply here.

For example, the magnetic element 240 may generate attraction with the slots sequentially in the circumferential direction by a 3-phase AC power applied through the coil wound in the respective slots 310 of the stator 300. As illustrated in FIG. 3, the magnetic element 240 may sequentially generate attraction with the slots 310 indicated by reference numerals ①, ②, ③, ①', and ②'. Through this, the magnetic element 240 may generate the rotational force F2 in the circumferential direction with respect to the support element 120. The support element 120 and the shield member 140 may be rotated by the rotational force F2 in a first direction in which the rotational force F2 acts.

The elastic element 220 may be compressed when the support element 120 is rotated by the magnetic element 240.

In this instance, the elastic element 220 may generate a compression restoring force F1 in a direction opposite to a rotation direction of the support element 120. By the compression restoring force F1, the support element 120 and the shield member 140 may rotate in a second direction opposite to the first direction.

The elastic element 220 may be interposed between a first protrusion 325 formed in the stator 300 and a second protrusion 125 formed in the support element 120. The elastic element 220 may include, for example, a spring. One end of the elastic element 220 may be fixed to the first protrusion 325 and the other end of the elastic element 220 may be fixed to the second protrusion 125.

The elastic element 220 may be pressurized by the second protrusion 125 in the first direction when the support element 120 rotates relative to the stator 300 in the first direction, so as to be compressed. Also, according to the elastic element 220 being compressed, the compression restoring force F1 may be generated in the second direction opposite to a direction in which the elastic element 220 is compressed.

In the motor 10, the rotational force F2 based on the attraction between the magnetic element 240 and the stator 300 may be greater than the compression restoring force F1 of the elastic element 220.

The support element 120 may partially rotate in the first direction based on the rotational force F2 by the magnetic element 240 in a state in which the rotor 400 is driven by the magnetic field formed in the stator 300.

Also, in a state in which the magnetic field is not formed in the stator 300 and the rotor 400 is not driven, the support element 120 may partially rotate in the second direction based on the compression restoring force F1 by the elastic element 220.

The support element 120 may move the shield member 140 by a predetermined distance based on the rotating. For example, the support element 120 may rotate by a distance corresponding to a half of an interval between neighboring shield elements. The shield elements may be arranged to be spaced at equal intervals in the circumferential direction. A degree to which the support element 120 rotates may be determined based on the number of shield elements included in the shield member 140.

For example, the support element 120 may rotate in the first direction or the second direction by an angle corresponding to "180°/(the number of the slots 310 of the stator 300)" or "180°/(the number of shield elements)."

The motor 10 may further include end rings 500 located at both end portions in the axial direction of the motor 10. The end rings 500 may prevent the rotor 400 and the moving member 200 from being deviated.

Figure 4A:
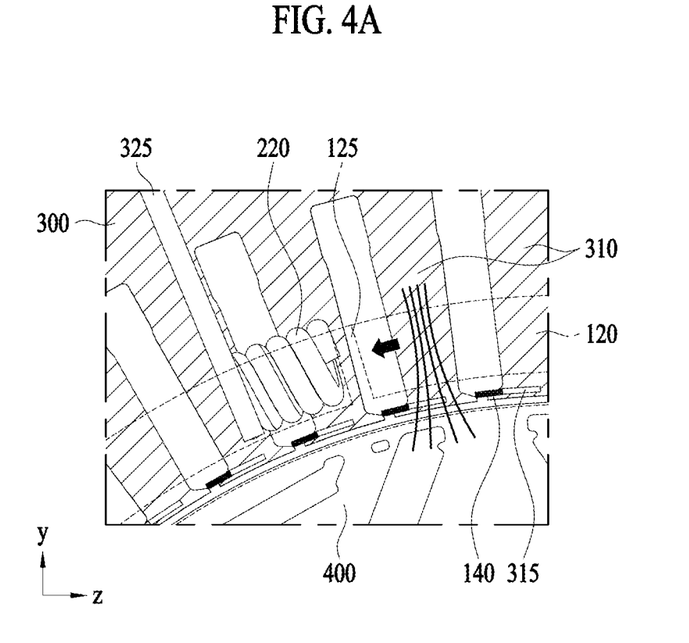
FIGS. 4A and 4B are views illustrating a motor in which a magnetic field is not screened between a stator and a motor according to at least one example embodiment of the present disclosure.
Figure 4B:
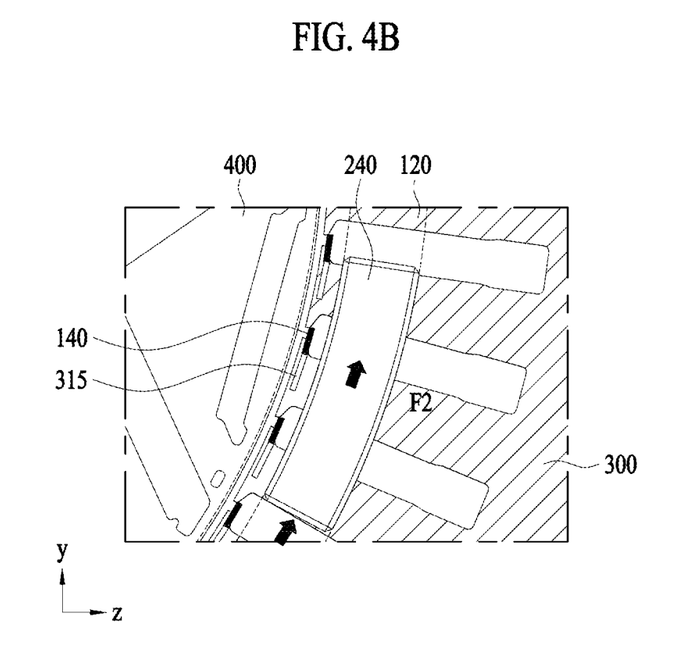
Figure 5A:
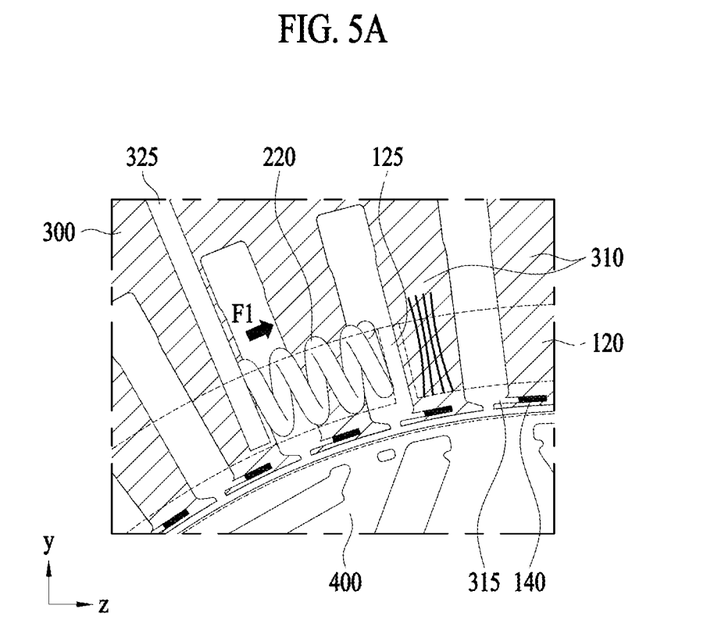
FIGS. 5A and 5B are views illustrating a motor in which a magnetic field is screened between a stator and a motor according to at least one example embodiment of the present disclosure.
Figure 5B:
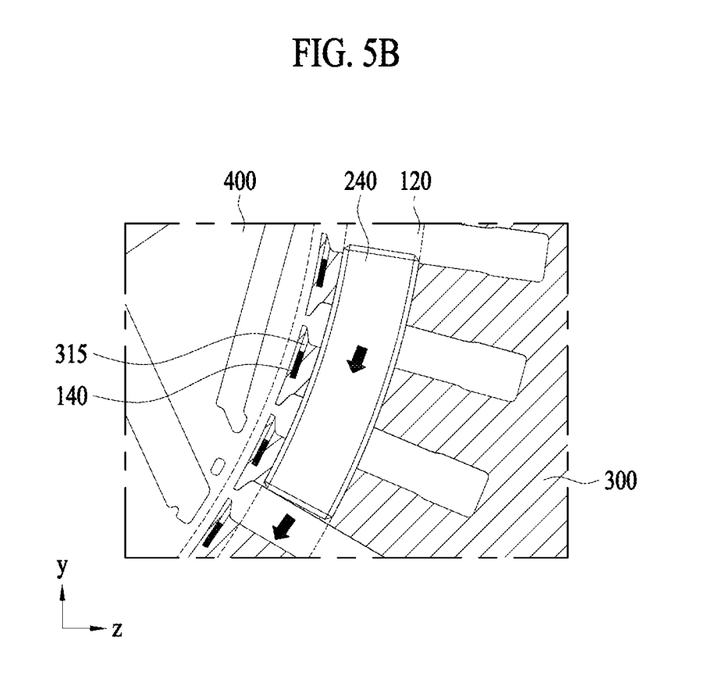

FIGS. 4A and 4B are views illustrating a motor in which a magnetic field is not screened between a stator and a motor according to at least one example embodiment of the present disclosure. FIGS. 5A and 5B are views illustrating a motor in which a magnetic field is screened between a stator and a motor according to at least one example embodiment of the present disclosure.

Referring to FIGS. 4A through 4B, the motor 10 may selectively screen a magnetic field flow between the stator 300 and the rotor 400 using the shield member 140.

The shield member 140 may be fixed to the support element 120 to integrally move with the support element 120 when the support element 120 moves. Based on the moving of the support element 120, the shield member 140 may screen a magnetic field flow between the rotor 400 and the slot 310 in which a coil (not shown) is wound in the stator 300 as illustrated in FIG. 4A or not screen the magnetic field flow as illustrated in FIG. 5A.

The stator 300 may include receiving grooves 315 into which the plurality of shield elements of the shield member 140 are respectively inserted according to the moving of the support element 120. For example, the receiving groove 315 may be formed on one side of an end portion of the slot 310 adjacent to the rotor 400.

Referring to FIGS. 4A and 4B, in a state in which the motor 10 is driven and a current is applied to a coil of the stator 300, the support element 120 and the shield member 140 may receive the rotational force F2 in the first direction due to an electromagnetic interaction between the magnetic element 240 and the stator 300. Accordingly, the shield member 140 may move relative to the stator 300 in the first direction, so that each of the shield elements is located outside the receiving groove 315.

When the shield member 140 is located outside the receiving groove 315, the magnetic field may be transmitted from coils wound in the slots 310 to the rotor 400 without interruption or intervention. The rotor 400 may rotate based on an electromagnetic interaction with the stator 300.

Referring to FIGS. 5A and 5B, in a state in which the driving of the motor 10 is suspended and the current is not applied to the coil of the stator 300, the support element 120 and the shield member 140 may move in the second direction opposite to the first direction by the compression restoring force F1 of the elastic element 220. Accordingly, the shield elements of the shield member 140 may be respectively inserted into the receiving groove 315 of the stator 300.

When the shield member 140 is located inside the receiving groove 315, the magnetic field flow between the stator 300 and the rotor 400 may be screened or interrupted. For example, even when the rotor 400 rotates by an inertial force, the electromagnetic interaction between the stator 300 and the rotor 400 may not occur or may occur minimally.

The elastic element 220 may connect the first protrusion 325 of the stator 300 and the second protrusion 125 of the support element 120 and is compressed or released when the support element 120 moves relative to the stator 300.

According to at least one example embodiment, the shield member 140 may rotate in the first direction or the second direction by an angle corresponding to a predetermined angle or a predetermined distance based on a rotation of the support element 120. For example, the shield member 140 may partially rotate in the first direction or the second direction by an angle corresponding to "180°/(the number of the slots 310 of the stator 300)" or "180°/(the number of shield elements)."

When the shield member 140 rotates in the first direction and is located outside the receiving groove 315 as illustrated in FIG. 4A, a further movement exceeding the predetermined distance or the predetermined angle may be restricted by an outer surface of a neighboring slot.

When the shield member 140 rotates in the second direction and is located inside the receiving groove 315 as illustrated in FIG. 5A, a further movement exceeding the predetermined distance or the predetermined angle may be restricted since only a movement corresponding to a length of the receiving groove 315 or less is allowed.

Figure 6:
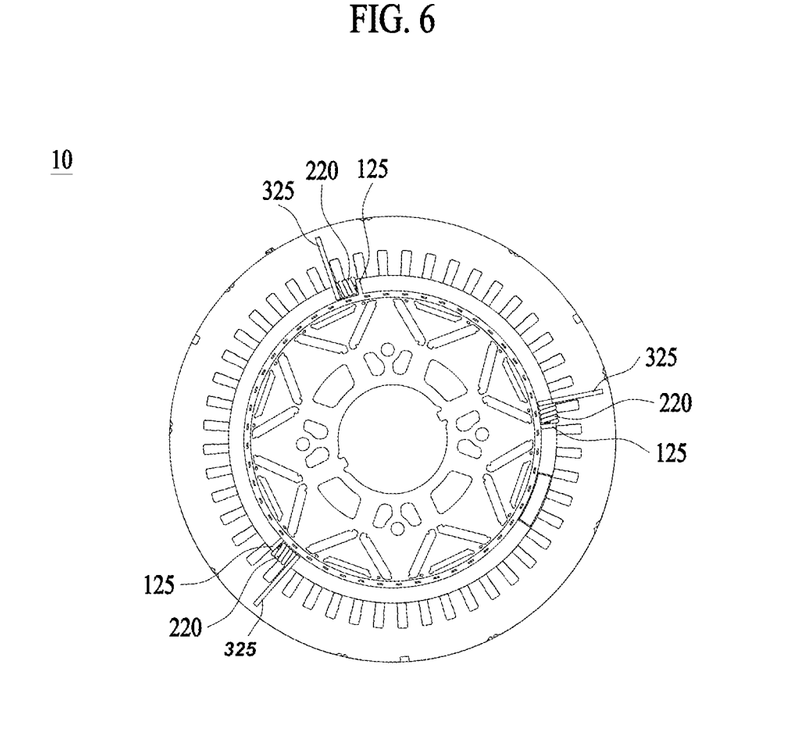
FIG. 6 is a cross-sectional view illustrating a motor according to at least one example embodiment of the present disclosure.

FIG. 6 is a cross-sectional view illustrating a motor according to at least one example embodiment of the present disclosure.

Referring to FIG. 6, the motor 10 may include a plurality of elastic elements 220 as the moving member 200.

The plurality of elastic elements 220 may be arranged to be spaced at equal intervals in the circumferential direction of the support element 120. Likewise, a plurality of first protrusions 325 may be provided in the stator 300 and a plurality of second protrusions 125 may be provided in the support element 120.

As illustrated in FIG. 6, by using the plurality of elastic elements 220, the moving member 200 may guide a position of the shield member 140 with increased stability.

Although not shown, the magnetic element 240 and the elastic element 220 may be provided as plural forms in the support element 120 disposed at each of the front end portion and the rear end portion of the shield member 140.

According to at least one example embodiment, the motor 10 may be provided in, for example, an electric vehicle. The electric vehicle may include a battery to supply power to the motor 10.

The electric vehicle may use the motor 10 including the shield member 140 to selectively screen a magnetic field between the stator 300 and the rotor 400 only when the electric vehicle is driven by inertia. Through this, the electric vehicle may prevent an overcharging of the battery or a user from feeling uncomfortableness during driving due to an occurrence of unintentional regenerative braking, and may minimize a generation of a counter electromotive force.

According to at least one example embodiment, it is possible to provide a motor with increased energy efficiency by applying a structure in which an electromagnetic interaction between a rotor and a stator occurs as intended during driving by an internal force and the electromagnetic interaction is restricted during driving by an external force.

Further, according to at least one example embodiment, it is possible to provide an electric vehicle equipped with the motor to extend a maximum driving distance and improve a drivability during driving.

It is apparent to those skilled in the art that the present disclosure may be materialized in other specific forms without departing from the essential characteristics of the present disclosure.

The detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A motor comprising:
    a stator;
    a rotor configured to rotate inside the stator in response to a first electromagnetic interaction with the stator;
    a shield member comprising a plurality of shield elements configured to screen a magnetic field between the stator and the rotor; and
    a moving member configured to control a position of the shield member in response to a second electromagnetic interaction with the stator such that screening of the magnetic field is configured to be selectively performed,
    wherein the moving member comprises:
        a support element configured to integrally rotate with the shield member,
        a magnetic element disposed on the support element, and rotating the support element in a first direction in response to the second electromagnetic interaction with the stator, and
        an elastic element disposed on the support element, and rotating the support element in a second direction opposite to the first direction in response to a compression restoring force.

2. The motor of claim 1, wherein the stator comprises a plurality of receiving grooves into which the plurality of shield elements is inserted, and
    wherein the moving member is further configured to position the plurality of shield elements inside the plurality of receiving grooves or outside the plurality of receiving grooves in response to the second electromagnetic interaction with the stator.

3. The motor of claim 2, wherein the shield member is configured to screen a magnetic field flow between the stator and the rotor when the plurality of shield elements are located inside the plurality of receiving grooves, and is not configured to screen the magnetic field flow between the stator and the rotor when the plurality of shield elements are located outside the plurality of receiving grooves.

4. The motor of claim 1, wherein the plurality of shield elements is spaced between the stator and the rotor at equal intervals in a circumferential direction.

5. The motor of claim 1, wherein the elastic element is interposed between a first protrusion formed in the stator and a second protrusion formed in the support element, and compressed by the first protrusion of the stator and the second protrusion of the support element when the support element rotates in the first direction.

6. The motor of claim 1, wherein when the second electromagnetic interaction between the stator and the magnetic element does not occur, the support element rotates in the second direction based on the compression restoring force from the elastic element.

7. The motor of claim 6, wherein the shield member is further configured to screen the magnetic field between the stator and the rotor in response to the plurality of shield elements being located inside the plurality of receiving grooves when the support element rotates in the second direction based on the compression restoring force from the magnetic element.

8. The motor of claim 1, wherein the shield member is further configured not to screen a magnetic field flow between the stator and the rotor in response to the plurality of shield elements being located outside the plurality of receiving grooves when the support element rotates in the first direction in response to the second electromagnetic interaction between the stator and the magnetic element.

9. The motor of claim 1, wherein the support element is disposed at a front end portion and a rear end portion of the shield member.

10. The motor of claim 1, wherein the moving member comprises a plurality of elastic members spaced apart.

11. A vehicle comprising:
    a battery; and
    a motor configured to generate a rotational torque by receiving electric power from the battery,
    wherein the motor comprises:
    a stator;
    a rotor configured to rotate in response to a first electromagnetic interaction with the stator;
    a shield member configured to screen a magnetic field formed in response to the first electromagnetic interaction between the stator and the rotor; and
    a moving member configured to control a position of the shield member in response to a second electromagnetic interaction with the stator, wherein the moving member comprises:
- a support element configured to integrally rotate with the shield member, and
- a magnetic element configured to rotate the support element in a first direction in response to the second electromagnetic interaction with the stator,
- an elastic element configured to rotate the support element in a second direction opposite to the first direction in response to a compression restoring force.

12. The vehicle of claim 11, wherein when the rotor rotates in response to the first electromagnetic interaction between the stator and the rotor, the magnetic element is further configured to generate the second electromagnetic interaction with the stator.

13. The vehicle of claim 12, wherein when the second electromagnetic interaction between the stator and the magnetic element occurs, the shield member is formed in the stator so as not to screen a magnetic field flow between the stator and the rotor.

14. The vehicle of claim 13, wherein when the second electromagnetic interaction between the stator and the magnetic element is eliminated, the shield member is formed in the stator so as to screen the magnetic field flow between the stator and the rotor.

15. The vehicle of claim 14, wherein when the shield member is located inside a plurality of receiving grooves of the stator, and wherein charging of the battery based on a rotation of the rotor is restricted.

16. The vehicle of claim 11, wherein the shield member comprises a plurality of shield elements spaced between the stator and the rotor at equal intervals in a circumferential direction, and
- wherein the support element is positioned at both end portions of the plurality of shield elements to integrally rotate with the plurality of shield elements.

17. The vehicle of claim 16, wherein the support element is rotated a predetermined distance by the magnetic element or the elastic element in a clockwise direction or a counterclockwise direction.

18. The vehicle of claim 17, wherein the support element is rotated by at least one of the magnetic element or the elastic element in the clockwise direction or in the counterclockwise direction at an interval at which the plurality of shield elements is arranged.

* * * * *